US010791219B1

(12) United States Patent
McGuire et al.

(10) Patent No.: US 10,791,219 B1
(45) Date of Patent: Sep. 29, 2020

(54) AUDIO CONTENT CONTROL OF IDLE CALL CONDITION

(71) Applicant: International Business Machines Corporation, Armonk, NY (US)

(72) Inventors: Michael James McGuire, Sydney (AU); James David Cleaver, Grose Wold (AU); Thuy Luong, Kellyville (AU); Mary Kathryn Aldridge, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/694,414

(22) Filed: Nov. 25, 2019

(51) Int. Cl.
*H04M 1/64* (2006.01)
*H04M 3/428* (2006.01)

(52) U.S. Cl.
CPC .................................. *H04M 3/4285* (2013.01)

(58) Field of Classification Search
CPC ................................................... H04M 3/4285
See application file for complete search history.

(56) References Cited

U.S. PATENT DOCUMENTS

| | | | |
|---|---|---|---|
| 6,694,012 B1 | 2/2004 | Posthuma | |
| 8,533,606 B2 | 9/2013 | Gibbon | |
| 9,596,347 B2 | 3/2017 | Ronketti | |
| 2006/0072716 A1 | 4/2006 | Pham | |
| 2006/0128365 A1* | 6/2006 | Kamdar | H04M 3/4872 455/414.3 |
| 2006/0188087 A1 | 8/2006 | Kortum | |
| 2007/0038443 A1 | 2/2007 | Thyssen | |
| 2007/0047711 A1* | 3/2007 | Florkey | H04M 3/4285 379/162 |
| 2008/0260138 A1* | 10/2008 | Chen | H04M 3/5238 379/215.01 |
| 2009/0185667 A1* | 7/2009 | Bychkov | H04M 3/4288 379/69 |

(Continued)

OTHER PUBLICATIONS

"Method and System for Delivering Personalized Music When a Call Is Placed on Hold", An IP.com Prior Art Database Technical Disclosure, IP.com No. IPCOM000233244D, IP.com Electronic Publication Date: Dec. 3, 2013, 3 pps., <https://priorart.ip.com/IPCOM/000233244>.

(Continued)

*Primary Examiner* — Simon King
(74) *Attorney, Agent, or Firm* — Daniel R. Simek (57) ABSTRACT

A method, program product, and system for audio content control during an idle condition of a telephonic call. A signal identifying an idle condition is received by a calling device from a called party, wherein the idle condition includes a wait-state connection to the called party. A signal is transmitted from the calling device to the called party confirming local control of audio content during the idle condition of the audio call. Preferences of audio content accessible to the calling device are determined. The audio content is delivered to the calling device, based on the preferences. An indicator signal of an interrupt point pause during delivery of the audio content is transmitted to the called party, and information associated with the idle condition of the audio call is received by the calling device, from the called party based on the indicator signal of the interrupt point.

20 Claims, 4 Drawing Sheets

(56) References Cited

U.S. PATENT DOCUMENTS

| | | |
|---|---|---|
| 2012/0139726 A1 | 6/2012 | Brunson |
| 2015/0189089 A1* | 7/2015 | Iltus .................... H04M 3/4285 379/266.06 |
| 2018/0302512 A1 | 10/2018 | Hamling |

OTHER PUBLICATIONS

"Method and System for Providing Preferred Music Content to a Caller During a Call Waiting Period", An IP.com Prior Art Database Technical Disclosure, IP.com No. IPCOM000202074D, IP.com Electronic Publication Date: Dec. 3, 2010, 2 pps., <https://priorart.ip.com/IPCOM/000202074>.

"Method to Personalize Caller's Experience While on Hold", An IP.com Prior Art Database Technical Disclosure, IP.com No. IPCOM000258545D, IP.com Electronic Publication Date: May 22, 2019, 3 pps., <https://priorart.ip.com/IPCOM/000258545>.

* cited by examiner

AUDIO CONTENT CONTROL OF IDLE CALL CONDITION

FIELD OF THE INVENTION

The present invention relates generally to the field of telecommunications, and more particularly to hold conditions of communications.

BACKGROUND OF THE INVENTION

Telecommunications are transmissions of information between sites by electromagnetic or optical signals. The information transmitted may be audio content, video content, a combination of audio and video content, or data. Some telecommunication sessions may include multiple parties transmitted over a network, but often the sessions are between two parties. Networks supporting telecommunication transmission include wireless cellular communications, voice over Internet Protocol (VoIP), and public switched telephone networks (PSTN).

Customer service a supporting service offered to current and potential customers and includes providing information and support associated with purchase and/or use of products or services. Additionally, a main intent of customer service is to provide a positive, enjoyable experience for the customer, associating the experience with the brand of the provider. Providing customer service often involves receiving phone calls from customers and providing answers and information to the customer or directing them to others that are able to provide the requested information. Often customer service organizations are staffed to minimize the idle time of service agents, which results in customer calls being placed in an idle holding state and waiting for an available agent to address their issue.

SUMMARY

Embodiments of the present invention disclose a method, computer program product, and system. The embodiments provide a method for enabling audio content control during an idle condition of a telecommunication session. One or more processors receive from a called party, a signal identifying an idle condition of an audio call originating from a calling device of a user, wherein the idle condition includes a waiting state connection to the called party. The one or more processors transmit a signal to the called party confirming a local control of audio content performed during the idle condition of the audio call. The one or more processors determine one or more preferences of audio content accessible from the calling device of the user. The one or more processors deliver the audio content accessible from the calling device of the user, based on the one or more preferences. The one or more processors transmit from the calling device of the user to the called party, an indicator signal of an interrupt point during delivery of the audio content, and the one or more processors receive information associated with the idle condition of the audio call from the called party based on receipt of the indicator signal of the interrupt point transmitted to the called party.

DETAILED DESCRIPTION

Embodiments of the present invention recognize that organizations providing products, services or information to users (i.e., enterprise organizations) strive to offer the users a high level of satisfaction and a positive, possibly enjoyable, experience during communications. To provide users with a positive experience, communications between organizations, such as businesses, service providers, government offices, and information organizations, are often directed to a customer service group dedicated to receiving communications from customers, clients, or users seeking information. Communications may include email, chat sessions, short message short message service (SMS), or telephonic calls.

Embodiments of the present invention recognize that users often select telephonic communications to avoid delays between iterative exchanges, and hopefully to gain an opportunity to speak directly with a person. Embodiments also recognize that groups receiving telephonic communications from users are often staffed to avoid unproductive time, and work with a waiting queue in which the user is placed in a waiting-state, referred to herein as an idle condition of the communication, and also known as being placed on hold. Enterprise organizations, and often mid-sized and small businesses, offer audio content to callers placed in an idle condition, also referred to herein as alternate audio content, intending the audio content to make the wait time more tolerable and pleasant.

Embodiments of the present invention provide a method, computer program product, and computer system for enabling control of selection and performance of audio content preferences from a calling device during an idle condition of a telecommunication session. In some embodiments, additional signaling is included between a calling device of the user, and the called party to which the user has contacted in the telephonic communication. The additional signaling provides for a signal transmitted by the called party to identify the idle condition of the communication call to the calling device; a return signal that provides for confirmation from the calling device to the called party that the audio content selection is controlled by the calling device; and provides for an interrupt signal identifying an appropriate interrupt point during the idle condition of the communication in which the called party can deliver information directed to the calling device regarding the communication call (e.g., wait time remaining).

In some embodiments of the present invention, the signal transmitted to the calling party from the calling device, also referred to herein as a/the return signal, indicating local control by the calling device of a selection of audio content enables the called party to avoid having to provide audio content during the idle condition of the communication. In some embodiments, the called party records the receipt of the calling party's signal as confirmation of an instance and duration in which the audio content is not provided by the called party. In an example embodiment, the called party is an enterprise business that quantifies instances and time duration of audio content provided by the called party during idle condition sessions of calling users. The called party may pay a fee based on the number of instances or the duration of run time of the provided audio content, but no fee is incurred for calls in which control of audio content resides with the calling device.

In some embodiments, the called party records each instance of the calling party signaling control of audio content during an idle condition of a telephonic call and may include the data of the instances in a report used for fee payment of providing audio content to calls placed in an idle condition. In some embodiments, local control of audio content preference selection by the calling device results in reduction of cost and copyright scrutiny by the called party to provide listening content to calling users during idle conditions. Additionally, the local control of audio content preference selection by the calling device enhances the experience during the idle condition session of the communication call placed by the user, because the user of the calling device can control the selection of audio content delivered during the idle condition of the telecommunication session.

In some embodiments of the present invention, the calling device transmits a signal to the called party indicating an appropriate interrupt point during the performance of the audio content. The signal indicating the interrupt point enables the called party to provide information to the calling device user, for example, indicating a position in the waiting queue or an estimate of remaining wait time. In some embodiments, the information message from the called party may include confirming the conclusion of the idle condition, information associated with the called party organization, advertisements, or other information.

Figure 1:
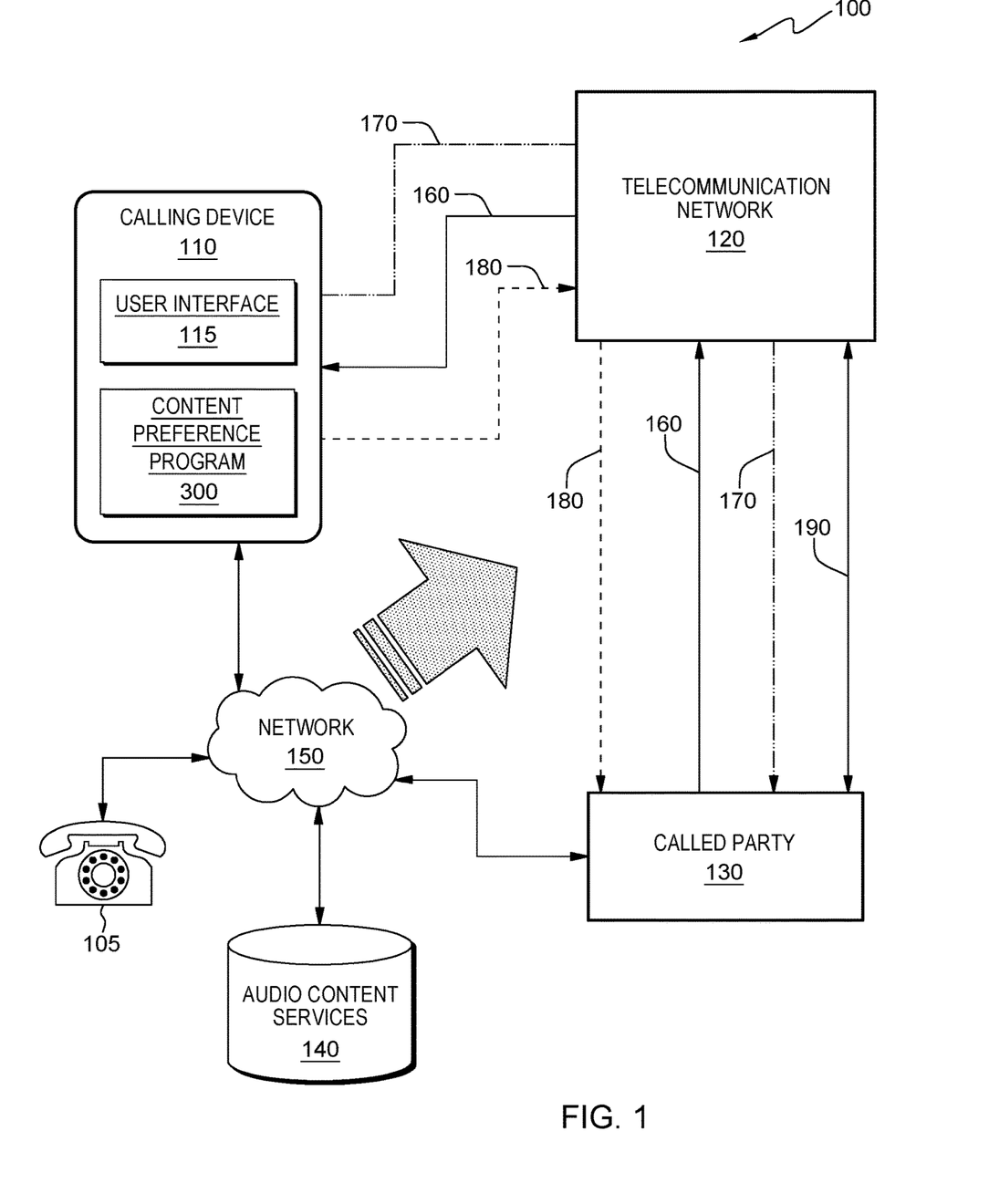
FIG. 1 is a functional block diagram illustrating a distributed communication processing environment, in accordance with an embodiment of the present invention.

The present invention will now be described in detail with reference to the Figures. FIG. 1 is a functional block diagram illustrating a distributed data communication environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data communication environment 100 includes public switched telephone network (PSTN) telephone 105, calling device 110, telecommunication network 120, called party 130, audio content services 140, and signal communications 160, 170, 180, and PSTN connection 190 all connected via network 150.

PSTN telephone 105 is a telephone utilizing a connection to telecommunication network 120 via PSTN connection 190. PSTN telephone 105 is not enabled with content preference program 300 and receives audio content from called party 130 during an idle condition of a communication. Called party 130 may record the instance and duration of the idle condition as it applies to fees for providing audio content to users.

Network 150 can be, for example, a local area network (LAN), a telecommunications network, a wide area network (WAN), such as the Internet, a virtual local area network (VLAN), or any combination that can include wired, wireless, or optical connections. In some embodiments of the present invention, at least a portion of telecommunication network 120 is included as a component within network 150, but telecommunication 120, signals 160, 170, 180 and PSTN connection 190 are represented separately to provide additional detail and clarity. In general, network 150 can be any combination of connections and protocols that will support communications between calling device 110, telecommunication network 120, called party 130, audio content services 140, signals 160, 170, 180, and PSTN connection 190, in accordance with embodiments of the present invention.

Calling device 110 is a smart device configured to perform telephone calls. Calling device 110 includes user interface 115 and content preference program 300. In some embodiments, calling device 110 a computing device of a user utilized to initiate and participate in a communications call, and configured to access audio content stored on calling device 110 or accessible via network 150, such as audio content services 140.

In some embodiments of the present invention, calling device 110 initiates and participates in telephone calls utilizing a cellular network connection, a voice over Internet protocol connection (VoIP), or at least in part, a public switch telephonic network (PSTN), depicted as telecommunication network 120. Calling device 110 initiates a call to called party 130 via network 150, which includes cellular, VoIP, and PSTN network channels, and receives signal 160 from called party 130 in response to called party 130 placing the communication in an idle condition. Calling device 110 transmits signal 170 to called party 130 confirming local control of audio content by calling device 110 during the idle condition of the current communication, also referred to herein as "a/the call". Additionally, responsive to determining a pause in the delivery of the audio content preference during the idle condition of the communication, calling device 110 transmits signal 180 to called party 130 indicating an appropriate interruption point to receive messages from called party 130.

In some embodiments, calling device 110 can be a standalone computing device, a smart phone, a smart tablet, a smart watch, a laptop computer, or any other electronic device or computing system capable of telephonic communication and receiving, sending, and processing data. In other embodiments, calling device 110 can be a computing device interacting with applications and services hosted and operating in a cloud computing environment. In another embodiment, calling device 110 can be a netbook computer, a desktop computer, a personal digital assistant (PDA), or other programmable electronic device capable of communicating with called party 130, audio content services 140, and other computing devices (not shown) within distributed data communication environment 100, via network 150, which includes telecommunication network 120. In another embodiment, calling device 110 represents a computing system utilizing clustered computers and components (e.g., database server computers, application server computers, etc.) that act as a single pool of seamless resources when accessed within distributed data communication environment 100. Calling device 110 includes internal and external hardware components, depicted in FIG. 4.

User interface 115 provides users an interface to access features and functions of calling device 110. In some embodiments of the present invention, user interface 115 provides access to content preference program 300. User interface 115 also supports access to other applications, features, and functions of calling device 110. User interface 115 supports access to alerts, notifications, initiation of telephonic communication, and other forms of communications. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of calling device 110. User interface 115 enables a user of calling device 110 to receive, view/hear, and respond to input, access applications, and perform functions available on calling device 110.

Content preference program 300 operates on calling device 110 and enables local control of the selection of audio content delivered during an idle condition of a telephonic communication of calling device 110. In some embodiments of the present invention, a user of calling device 110 accesses content preference program 300 and selects preferred audio content to perform during detected idle conditions of a communication call. In some embodiments the audio content preferences can include, but are not limited to: audio books, podcasts, digitized magazines, educational content, news content, musical content, sounds of nature, tones, and silence. In some embodiments, the audio content may be stored on calling device 110, whereas in other embodiments the audio content is accessed remotely or is received as a streaming feed from an audio content provider, such as audio content services 140.

The intended party to which calling device initiates a telephone communication call is referred to, herein, as the "called party", and the called party receives the telephone communication call (i.e., "the call) and in embodiments of the present invention, places the call from calling device 110 in a waiting-state, which is referred to herein as placing the call in an idle condition. The idle condition is also often referred to as "on hold." In an example embodiment, content preference program 300 receives a signal from the called party indicating the call as being placed in an idle condition. In response to receiving the idle condition signal from the called party, content preference program 300 returns a signal to the called party indicating that audio content delivered during the idle condition of the call will be controlled by content preference program 300. During the performance of the audio content, content preference program 300 monitors the audio content to detect a pause in the content delivery and sends a signal to the called party indicating an interrupt point at which delivery of the audio content is paused, allowing the called party to provide an information message to calling device 110. The information message may identify a position of the call in a waiting queue, an estimated duration time of the idle condition, or other information, such as information about the called party, advertisements, or information of general interest.

In some embodiments, the called party subsequently sends a signal indicating the call is removed from the idle condition and the call proceeds from that point. In some embodiments, the signal indicating the idle condition may be pervasive (and inaudible) for the duration of the idle condition, and the absence of the signal indicating the transition of the call from the idle condition at which point the preferred audio content delivery is terminated. In some embodiments, the end point of the audio content delivery may be stored so that the audio content may continue from the end point at a subsequent idle condition.

In various embodiments, telecommunication network 120 is a component of network 150 and is depicted separately to provide detail and clarity of signaling between content preference program 300 on calling device 110 and the called party 130. In some embodiments, telecommunication network 120 includes, but is not limited to public switch telephone networks (PSTN), cellular networks, voice over Internet Protocol networks (VoIP). Telecommunication network 120 processes a telephonic communication (call) between calling device 110 and called party 130. Additionally, telecommunication network 120 processes signal 160, 170, and 180 during an idle condition of a call established between calling device 110 and called party 130.

Called party 130 is an entity to which calling device 110 places a telephonic communications call. In embodiments of the present invention, called party 130 receives the call and subsequently places the call from calling device 110 in an idle condition and transmits a signal to calling device 110 via network 150 indicating the idle condition of the call. In some embodiments, subsequent to receiving a signal transmitted from the calling device indicating local control of audio content delivery by the calling device, the called party records information associated with the instance of the call indicating that the called party did not provide audio content for the duration of the idle condition for the instance of the call, which may be applied to reduce fees paid by the called party. In some embodiments, the called party can apply an over-ride feature to the local control of audio content to provide an information message to the user of the calling device in the absence of receiving a signal from the calling device indicating an interrupt point, within a predetermined duration. For example, if the calling device signals local control of audio content delivery during the idle condition of the call and does not provide an interrupt point signal to the called party within a predetermined time duration, the called party may over-ride the local control and deliver an audio information message to the user of the calling device.

In some embodiments of the present invention, called party 130 is an enterprise organization providing products and/or services to users and offering telephonic communication contact via telecommunication network 120 as a component of network 150. In some embodiments, called party 130 is a mid-sized or small business or organization entity similarly offering telephonic communication contact to customers, clients, and inquiring users of called party 130.

In an example embodiment, called party 130 receives a call from calling device 110 and in response to placing the call in an idle condition, called party 130 transmits a signal to calling device 110 indicating the idle condition of the call. In some embodiments in which content preference program 300 operates on calling device 110, called party 130 receives a response signal from calling device 110 indicating that audio content delivered during the idle condition of the call is controlled by calling device 110. In some embodiments, called party 130 records the instance of audio content delivered on the call as use of user-based content not provided by called party 130.

At a subsequent time during the idle condition of the call, called party 130 receives a signal from calling device 110 indicating an interrupt point convenient to interrupt the delivery of the audio content, and called party 130 transmits an information message to calling device 110. The information message may correspond to a position of the call in a response queue for called party 130 or may indicate an estimated duration of the idle condition, or may include advertisement, information about called party 130, or other information. For the case in which an interrupt point signal was not sent to the called party during the idle condition of the call and a predetermined duration of time expired, the called party may over-ride the local control of audio content delivery by the calling device and deliver an information message during the idle condition of the call.

In some embodiments, called party 130 offers simultaneous call connection to multiple users using a communication bridge, such as a conference call. Called party 130 determines users connected to the communication bridge and detects when a calling device of a user of the multiple users is placed in an idle condition. Called party 130 responds by muting the calling device, connected to the communication bridge while the device is in an idle condition.

Audio content services 140 is a source of audio content delivered and performed on calling device 110 during an idle condition of a call. In some embodiments, audio content services 140 is a source of audio content accessed by content preference program 300 operating on calling device 110 and stored locally on calling device 110 for subsequent use during idle conditions of calls. In other embodiments, audio content services 140 is an audio content streaming service and selections made by content preference program 300 are transmitted to calling device 110 and performed during an idle condition of a call. In some embodiments, content of audio content services 140 includes, but is not limited to: digitized audio content of books, magazines, articles, podcasts, news, sports events and information, educational materials, self-improvement materials, and music. In some embodiments, audio content services 140 is a subscription service having fees paid by a user of the services. In other embodiments, audio content services 140 is included in a telephonic communications package offered by a telecommunication carrier service.

Signal 160 is generated by called party 130 as a call received by called party 130 is placed in an idle condition. Receipt of signal 160 by a calling device operating content preference program 300, such as calling device 110, indicates to the calling device that the call has been placed in an idle condition. In some embodiments, signal 160 is transmitted via telecommunication network 120 to the calling device, such as calling device 110. In other embodiments, signal 160 may be transmitted via other networks of network 150, for example, via Wi-Fi networks. In yet other embodiments, signal 160 may be transmitted over a combination of networks.

Signal 170 is generated by content preference program 300 operating on calling device 110 subsequent to receiving signal 160 from called party 130. Signal 170 is transmitted to called party 130 and indicates that audio content performed during the idle condition is controlled by the calling device, such as content preference program 300 operating on calling device 110. In some embodiments of the present invention, subsequent to receiving signal 170 from calling device 110, called party 130 records information associated with the instance of the idle condition of the call indicating that called party 130 is not providing an alternate audio content delivery (not local delivery) for the duration of the idle condition of the call. The recorded information may be applied to reduce fees paid for providing audio content by called party 130 during call idle conditions. In some embodiments, signal 170 is transmitted via telecommunication network 120 to the called party, such as called party 130. In other embodiments, signal 170 may be transmitted via other networks of network 150, for example, via Wi-Fi networks. In yet other embodiments, signal 170 may be transmitted over a combination of networks.

Signal 180 is generated by content preference program 300 operating on calling device 110 and transmitted to called party 130. Signal 180 is generated in response to content preference program 300 detecting a convenient pause in the delivery of the audio content and is transmitted to called party 130 indicating an interruption point in the audio content delivery. Responsive to detecting a convenient pause in the audio content delivery, content preference program 300 temporarily halts the delivery of the audio content, enabling called party 130 to provide information messages without inconvenient interruption of the audio content delivery, maintaining a positive experience for the user of the calling device. In some embodiments, in which signal 180 was not sent to the called party indicating a convenient pause in audio content delivery during the idle condition of the call and a predetermined duration of time has expired, called party 130 over-rides the local control of audio content delivery by calling device 110 and delivers an information message during the idle condition of the call.

PSTN connection 190 depicts a connection to PSTN telephone 105 to called party 130 via network 150, using a PSTN component network (not shown). PSTN connection 190 illustrates a call connection to called party 130 in which control of audio content performed during an idle condition of a call remains with called party 130. PSTN connection 190 does not include signal 160, 170, and 180.

Figure 2:
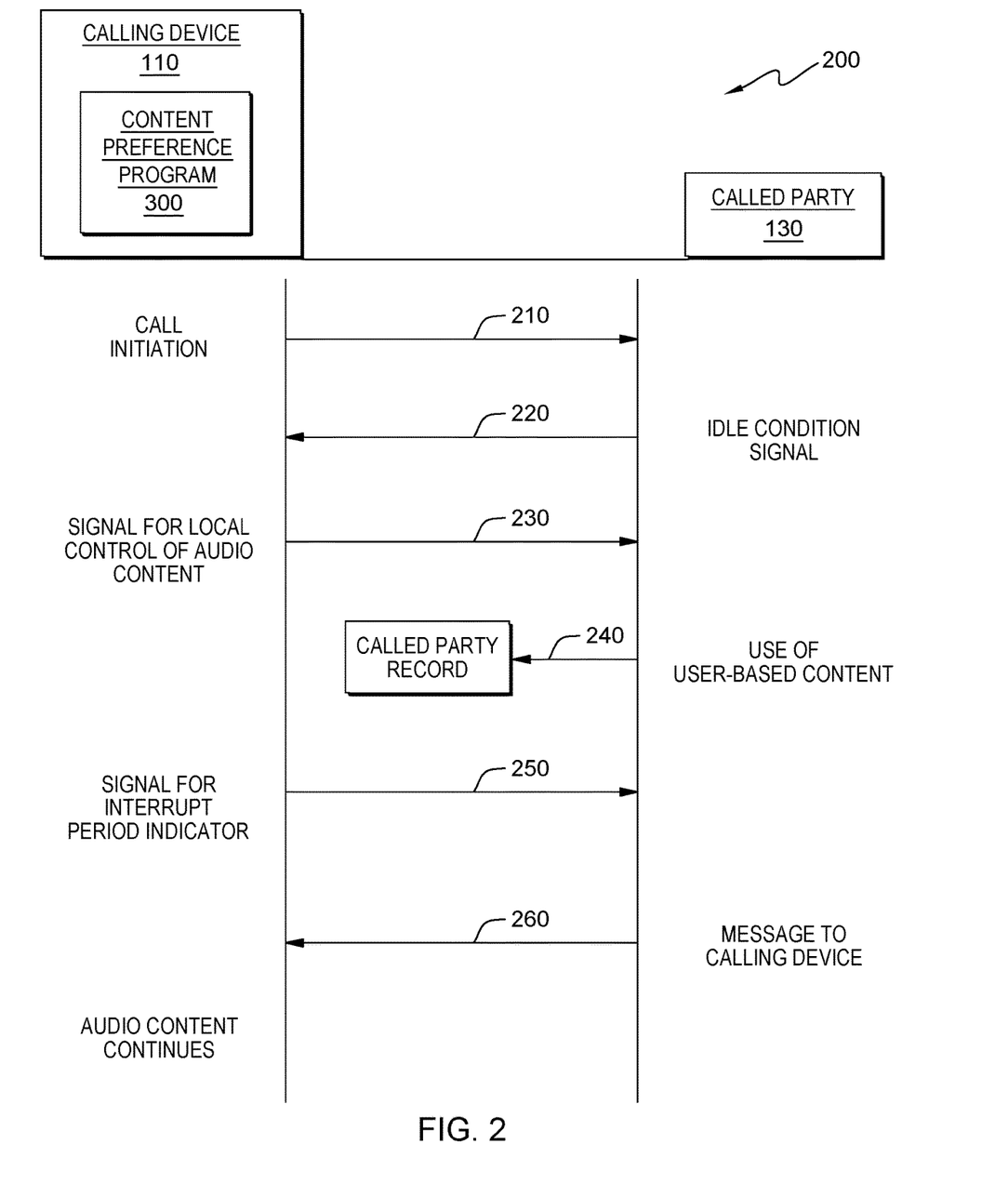
FIG. 2 is an event sequence diagram depicting activity between a calling device and called party of a communication, in accordance with an embodiment of the present invention.

FIG. 2 illustrates event sequence diagram 200, depicting activity between calling device 110 and called party 130 of a communication, in accordance with an embodiment of the present invention. Event sequence diagram 200 includes event 210 which depicts an initiation of a call, event 220, which includes an idle condition signal, event 230, which includes a signal indicating local control of audio content, event 240, which includes a record of user-based content use during the idle condition, event 250, which includes a signal for indicating an interrupt point within the content, and event 260, which includes a message to the calling device.

Event 210 is an event in which calling device 110 (FIG. 1) initiates a telephonic communication call to called party 130, and the call is received by called party 130.

Event 220 is an event in which called party 130 transmits a signal to calling device 110 indicating initiation of an idle condition subsequent to receiving the call from calling device 110. In some embodiments of the present invention, the call received by called party 130 is answered by a user and is subsequently placed in an idle condition, which initiates an idle condition signal from called party 130, sent to calling device 110. In other embodiments, the call received by called party 130 is automatically placed in an idle condition due to an existing call in progress with called party 130, or a queue of previously received calls all placed in an idle condition. The idle condition signal of event 220 is received by content preference program 300 operating on calling device 110.

Event 230 is an event in which calling device 110 transmits a signal indicating that audio content for the duration of the idle condition is controlled by content preference program 300 operating on calling device 110. The signal indicating local control of audio content is transmitted from calling device 110 in response to receiving the signal indicating the idle condition of the call from called party 130.

Event 240 is an event in which called party 130 records that the received call in idle condition includes user-based audio content use. In some embodiments the record of user-based content usage during the idle condition for the call is generated and placed in called party 130 memory. In other embodiments, receipt of the signal indicating local control of audio content of event 230 generates a record stored in an audio content usage file of called party 130 and ultimately resides in a persistent memory. In some embodiments of the present invention, records of calls indicating user-based audio content usage during idle conditions document instances and duration metrics used to reduce cost of called party 130 providing audio content and reduces exposure of called party 130 to copyright violation issues.

Event 250 is an event in which content preference program 300, operating on calling device 110, transmits a signal to called party 130 indicating an interrupt point within the content delivery during the idle condition of the call. Content preference program 300 monitors the locally controlled audio content for a pause in the content delivery and halts the delivery of the audio content at the detected pause and sends a signal to called party 130 indicating a convenient interruption point for called party 130 to provide an information message. By providing the interrupt point indicator signal to called party 130, the user experience of listening to the audio content remains positive, and the information message is delivered without disruption of the audio content or distraction of the user.

Event 260 is an event in which called party 130 transmits an information message to calling device 110, in response to receiving an interrupt point indicator signal from content preference program 300. In some embodiments of the present invention, the information message includes a status of the idle condition of the call and indicates an order of the call in an idle condition queue of called party 130. In other embodiments, the information message includes an estimated duration of the idle condition of the call. In yet other embodiments, the information message may include other information, such as advertisement, information regarding called party 130, information of interest to a user of calling device 110, or a combination of the idle condition status and other information. In some embodiments of the present invention, called party 130 may transmit the information message prior to receiving the interrupt point indicator signal from content preference program 300 in response to exceeding a pre-determined duration of time without receiving an interrupt point indicator signal.

Having delivered an information message from called party 130 to calling device 110, content preference program 300 resumes the audio content delivered during the idle condition of the call. For the case in which the audio content is streaming content, content preference program 300 buffers the streaming content during the transmission of the interrupt period signal to called party 130, and the delivery of the information message from called party 130.

Figure 3:
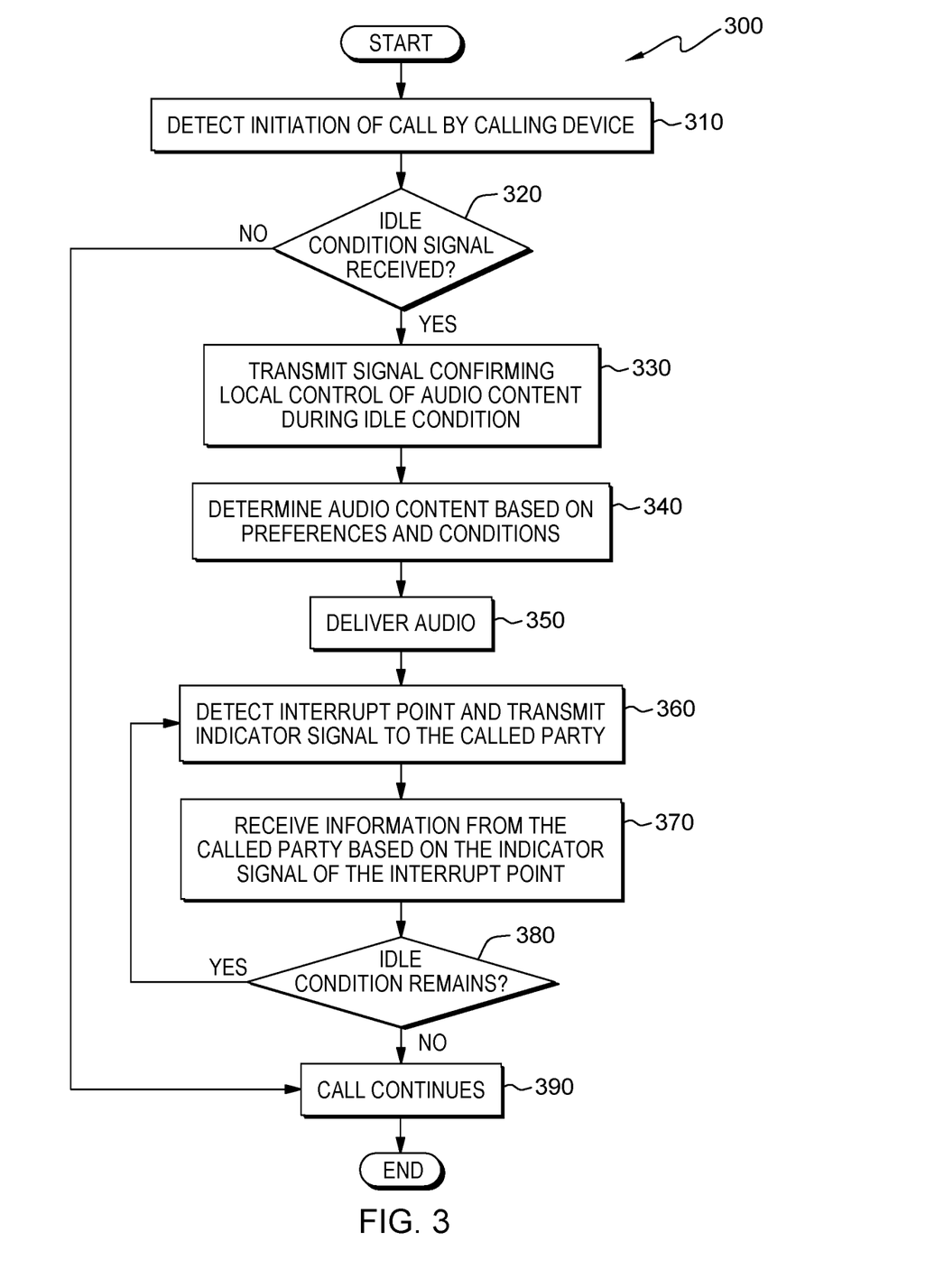
FIG. 3 is a flowchart depicting operational steps of a content preference program, in accordance with embodiments of the present invention.

FIG. 3 is a flowchart depicting operational steps of content preference program 300, operating in distributed data communications environment 100, in accordance with embodiments of the present invention. Content preference program 300 detects the initiation of a telecommunication call by the calling device (step 310). Content preference program 300 operates on a calling device and detects the initiation of a call placed by the calling device to a called party. For example, calling device 110 hosts content preference program 300, which detects the initiation of a call placed by calling device 110 to called party 130.

Content preference program 300 determines whether an idle condition signal is received for the call (decision step 320). Content preference program 300 determines whether a signal is received from the called party indicating placement of the call in an idle condition. In some embodiments of the present invention, the call is received and answered by a user of the called party who places the call in an idle condition. In other embodiments, the call is received by the called party and immediately placed in an idle condition. Content preference program 300 determines the idle condition based on whether a signal from the called party is received in response to the called party placing the call in an idle condition. For example, content preference program 300 determines that the call was received by called party 130 (FIG. 1), based on an answering of the call. Content preference program 300 monitors for a signal sent by called party 130 to calling device 110, indicating the call has been placed in an idle condition.

For the case in which content preference program 300 determines that the call has not been placed in an idle condition (step 320, "NO" branch), content preference program 300 proceeds to step 390, and the telephonic communication call continues, and content preference program 300 ends. For the case in which content preference program 300 determines that an idle condition signal is received (step 320, "YES" branch), content preference program 300 transmits a signal to the called party confirming local control of audio content delivered during the idle condition of the call (step 330). The signal confirming local control of audio content delivery is received by the called party and prevents delivery of audio content that would normally be delivered by the called party, to the calling device.

For example, having received a signal from called party 130 indicating the call has been placed in an idle condition, content preference program 300 transmits a signal in response that confirms to called party 130 that the control of audio content performed during the idle condition of the call resides with content preference program 300 operating on calling device 110. In some embodiments, called party 130 records information associated with the instance of local control of audio content by calling device 110 during the idle condition of the call, which may be applied to reduce fees paid by calling party 130 to otherwise be a provider of audio content during idle conditions of a call. In some embodiments, a return signal from called party 130 may be transmitted to acknowledge receipt of the local control signal from content preference program 300 (not shown).

Content preference program 300 determines preference of audio content (step 340). In some embodiments of the present invention, content preference program 300 includes configuration functions enabling a user of the hosting device of content preference program 300 to select audio content preferences. In some embodiments, the audio content may be stored on the calling device, or in other embodiments, the audio content may be provided as streaming content from a source external to the calling device. In some embodiments, the selection of preferences of audio content may include additional conditions considered by content preference program 300 in determining audio content delivery. In an example embodiment, preference conditions may include audio content to deliver for a range of time during the day, such as prior to noon, a second preference to deliver after noon until 4 p.m., and a third preference to deliver after 4 p.m. until midnight. In other embodiments, the conditions associated with audio content selection may be based on the day-of-the-week, a range of weeks such as a holiday season, or based on a sequenced list of audio content.

For example, in response to receiving a signal indicating an idle condition of a call and transmitting a signal confirming local control of audio content, content preference program 300 determines that preference of audio content depends on a time of day, and day-of-the-week. Content preference program 300 determines the current time of day and day-of-the-week and identifies the audio content configured by a user of calling device 110 to be delivered as a preference at the determined timeframe.

Content preference program 300 delivers the preferred audio content (step 350). Having determined the appropriate audio content to deliver based on the previously configured preferences and conditions, content preference program 300 delivers the audio content to the calling device for the user of the calling device to listen to during the idle condition of the call. For example, content preference program 300 determines that audio content of a selected educational podcast is the preferred content for the user of calling device 110 for idle conditions of telecommunication calls that occur prior to noon. In another example embodiment, content preference program 300 determines that during an idle condition of a call audio content from a particular music playlist stored on calling device 110 is the preferred delivery of audio content.

Content preference program 300 detects an interrupt point within the audio content and transmits an interrupt signal to the called party (step 360). In some embodiments of the present invention, content preference program 300 monitors the delivery of the selected audio content to detect a pause in the delivery of the audio content that would make a suitable interruption point for the called party to provide a message of information to a user listening to the audio content during the idle condition of the call. Content preference program 300 transmits a signal indicating the interruption point to the called party.

In some embodiments, in response to detecting a pause in the delivery of the audio content, content preference program 300 halts the delivery of the audio content at the detected pause (not shown), enabling receipt of a message from the called party without interruption or "stepping on" the delivery of the audio content. In some embodiments, content preference program 300 continues delivery of the audio content after determining the end of an information message from the called party, or after a pre-determined duration in which content preference program 300 determines that no information message is received. In some embodiments, in which content preference program 300 fails to send signal 180 indicating an interruption point to called party 130 during the idle condition of the call and a predetermined duration of time has expired, called party 130 over-rides the local control of audio content delivery by calling device 110 and delivers an information message during the idle condition of the call.

For example, content preference program 300 monitors the delivery of a streaming news service to which the user of calling device 110 has subscribed. Content preference program 300 detects a pause after a particular news subject has been delivered, prior to the beginning of a next subject, and halts the delivery of the streaming news service, buffering the content, and sends a signal to called party 130 indicating an interrupt point in the audio content delivery. Detecting a pause in the delivery of the audio content maintains the user experience of listening to the audio content without disruption or distraction, while providing opportunity for the called party to provide information in the form of an audio message delivered to the calling device.

Having halted delivery of the audio content performed during the idle condition of the call, content preference program 300 receives an information message from the called party, based on the interrupt point indicator signal (step 370). Content preference program 300 detects the information message delivered from the called party and determines when the message concludes. Content preference program 300 determines the conclusion of the information message from the called party and resumes delivery of the audio content.

In some embodiments of the present invention, subsequent to halting delivery of the audio content corresponding to the interrupt point, content preference program 300 fails to detect delivery of an information message to the calling device. Content preference program 300 maintains the interruption of audio content delivery for a pre-determined duration of time and resumes delivery subsequent to an expiration of the pre-determined duration of time.

For example, content preference program 300 halts the delivery of a streaming podcast selected as a preference by the user of calling device 110 during the idle condition of a call and sends an interrupt point signal to called party 130 indicating a convenient interruption point for called party 130 to provide an information message. Called party 130 responds to the interrupt point signal by sending an information message to calling device 110 indicating the call is third in a waiting queue of called party 130. Content preference program 300 detects the conclusion of the information message and resumes delivery of the podcast audio content. If content preference program 300 fails to detect an information message from called party 130, then content preference program 300 can resume the delivery of the audio content subsequent to expiration of a pre-determined duration of time.

Content preference program 300 determines whether the idle condition remains (decision step 380). In some embodiments of the present invention the information message from the called party may be a transition of the call from the idle condition to an active call with the called party. In other embodiments, content preference program 300 fails to detect an information messaged from the called party and determines an active call condition exists due to an absence of the signal indicating the idle condition of the call. In yet other embodiments, content preference program 300 detects a signal indicating the conclusion of the idle condition and the resumption of an active call. For the case in which content preference program 300 determines that the idle condition has concluded (step 380, "NO" branch), content preference program 300 stops delivery of the audio content and detects an active call condition with the called party, the active call continuing (step 390), and content preference program 300 ends.

For example, content preference program 300 detects the conclusion of the idle condition by an absence of the signal from called party 130 corresponding to the idle condition of the call. Content preference program 300 stops delivery of the podcast to calling device 110, and content preference program 300 ends. In another example embodiment, content preference program 300 detects a signal from called party 130 indicating the conclusion of the idle condition, and resumption of the active call. Content preference program 300 stops delivery of the podcast audio content to calling device 110, and proceeds to continue with the active call condition, and content preference program 300 ends.

For the case in which content preference program 300 determines that the idle condition remains (step 380, "YES" branch), content program 300 returns to step 360 to monitor the resumed delivery of the audio content to the calling device for an interrupt point. Content preference program 300 transmits an indicator signal of the interrupt point to the called party and continues as described above.

Figure 4:
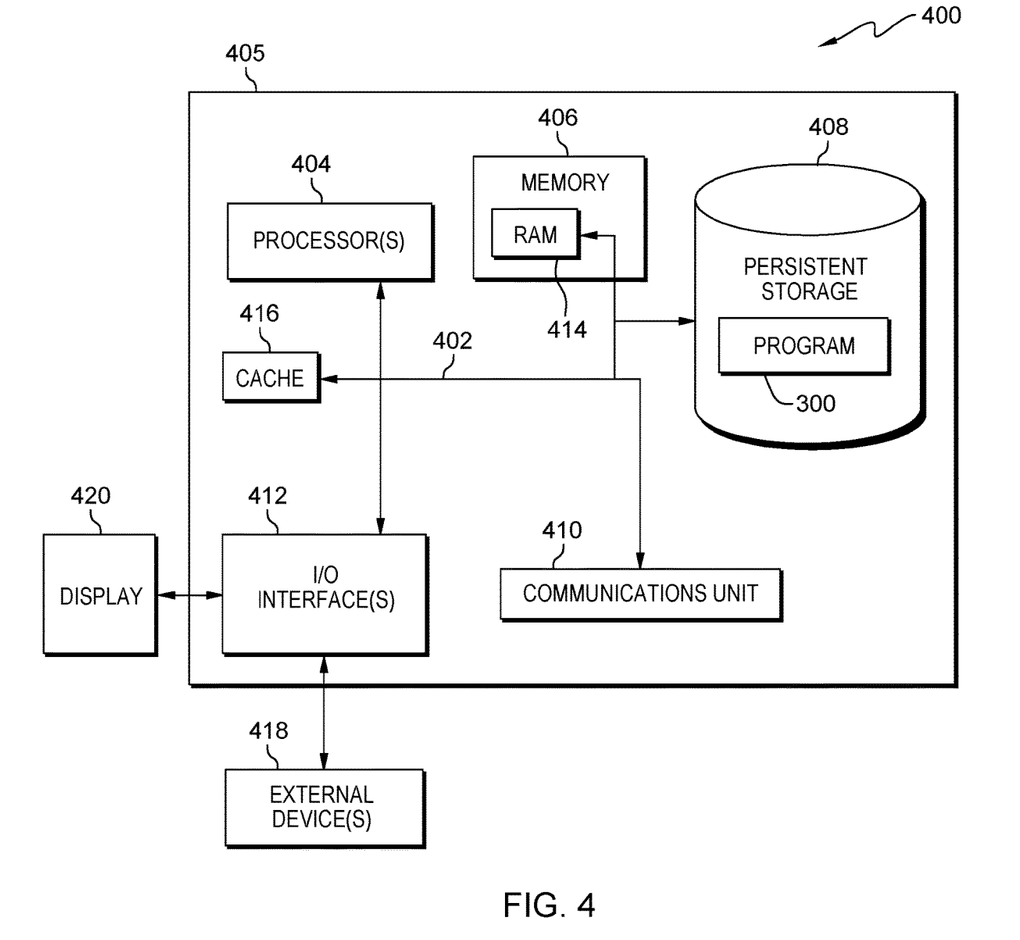
FIG. 4 depicts a block diagram of components of a computing system, including a calling device configure with capability to operationally perform the content preference program of FIG. 3, in accordance with an embodiment of the present invention.

FIG. 4 depicts a block diagram of components of computing system 400, including computing device 405, configured to include or operationally connect to components depicted in FIG. 1, and capable of performing operational steps of content preference program 300 of FIG. 3, in accordance with an embodiment of the present invention, in accordance with an embodiment of the present invention.

Computing device 405 includes components and functional capability similar to components of calling device 110 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

In one embodiment, content preference program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Content preference program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., content preference program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for enabling audio content control during an idle condition of a telecommunication session, the method comprising:
    one or more processors receiving from a called party, a signal identifying an idle condition of an audio call originating from a calling device of a user, wherein the idle condition includes a waiting state connection to the called party;
    responsive to receiving the signal identifying the idle condition, the one or more processors transmitting a return signal to the called party confirming a local control of audio content played during the idle condition of the audio call;
    the one or more processors identifying the audio content based on one or more preferences of audio content accessible from the calling device of the user;
    the one or more processors delivering the audio content accessible from the calling device of the user, based on the one or more preferences and conditions associated with the one or more preferences;
    the one or more processors transmitting, an indicator signal of an interrupt point to the called party during the delivery of the audio content by the calling device of the user; and
    the one or more processors receiving information associated with the idle condition of the audio call from the called party based on the indicator signal of the interrupt point transmitted to the called party.

2. The method of claim 1, wherein the audio content accessible from the calling device of the user includes audio content from a subscription service delivered to the calling device of the user.

3. The method of claim 1, wherein the audio content accessible from the calling device of the user includes audio content stored on the calling device of the user.

4. The method of claim 1, further comprising:
    the one or more processorsreporting an omission of participation in receiving an alternate audio content delivery provided by the called party during the idle condition by the user associated with the audio call originating from the calling device, based on the return signal to the called party confirming the local control of the audio content played during the idle condition of the audio call.

5. The method of claim 1, wherein the conditions associated with the one or more preferences include a pre-selection of a preference based on a time of day.

6. The method of claim 1, wherein the conditions associated with the one or more preferences include a pre-selection of a preference based on a day-of-the-week.

7. The method of claim 1, further comprising:
    the one or more processors receiving a message from the called party regarding a status of the idle condition, based on the indicator signal of the interrupt point transmitted during the delivery of the audio content.

8. A computer program product for enabling audio content preference during an idle condition of a telecommunication session, the computer program product comprising:
    one or more computer readable storage media and program instructions stored on the one or more computer readable storage media, the program instructions comprising:

program instructions to receive from a called party, a signal identifying an idle condition of an audio call originating from a calling device of a user, wherein the idle condition includes a waiting state connection to the called party;

responsive to receiving a signal identifying the idle condition, program instructions to transmit a return signal to the called party confirming a local control of audio content played during the idle condition of the audio call;

program instructions to identify one or more preferences of the audio content accessible from the calling device of the user;

program instructions to deliver the audio content accessible from the calling device of the user, based on the one or more preferences and conditions associated with the one or more preferences;

program instructions to transmit an indicator signal of an interrupt point to the called party during the delivery of the audio content by the calling device of the user; and program instructions to receive information associated with the idle condition of the audio call from the called party based on the indicator signal of the interrupt point transmitted to the called party.

9. The computer program product of claim 8, wherein the audio content accessible from the calling device of the user includes audio content from a subscription service delivered to the calling device of the user.

10. The computer program product of claim 8, wherein the audio content accessible from the calling device of the user includes audio content stored on the calling device of the user.

11. The computer program product of claim 8, further comprising:

program instructions to report an omission of participation in receiving and alternate audio content delivery provided by the called party during the idle condition by the user associated with the audio call originating from the calling device, based on the return signal to the called party confirming the local control of the audio content played during the idle condition of the audio call.

12. The computer program product of claim 8, wherein the conditions associated with the one or more preferences include a pre-selection of a preference based on a time of day.

13. The computer program product of claim 8, wherein the conditions associated with the one or more preferences include program instructions to receive a pre-selection of a preference based on a day-of-the-week.

14. The computer program product of claim 8, further comprising:

program instructions to receive a message from the called party regarding a status of the idle condition, based on the indicator signal of the interrupt point transmitted during the delivery of the audio content.

15. A computer system for enabling audio content preference during an idle condition of a telecommunication session, the computer system comprising:

one or more computer processors;

one or more computer readable storage media; and program instructions stored on the one or more computer readable storage media, the program instructions comprising:

program instructions to receive from a called party, a signal identifying an idle condition of an audio call originating from a calling device of a user, wherein the idle condition includes a waiting state connection to the called party;

responsive to receiving a signal identifying the idle condition, program instructions to transmit a return signal to the called party confirming a local control of audio content played during the idle condition of the audio call;

program instructions to identify one or more preferences of the audio content accessible from the calling device of the user;

program instructions to deliver the audio content accessible from the calling device of the user, based on the one or more preferences and conditions associated with the one or more preferences;

program instructions to transmit an indicator signal of an interrupt point to the called party during the delivery of the audio content by the calling device of the user; and program instructions to receive information associated with the idle condition of the audio call from the called party based on the indicator signal of the interrupt point transmitted to the called party.

16. The computer system of claim 15, wherein the audio content accessible from the calling device of the user includes audio content from a subscription service delivered to the calling device of the user.

17. The computer system of claim 15, wherein the audio content accessible from the calling device of the user includes audio content stored on the calling device of the user.

18. The computer system of claim 15, further comprising:

program instructions to report an omission of participation in receiving alternate audio content delivery provided by the called party during the idle condition by the user associated with the audio call originating from the calling device, based on the return signal to the called party confirming the local control of the audio content played during the idle condition of the audio call.

19. The computer system of claim 15, wherein the conditions associated with the one or more preferences include program instructions to receive a pre-selection of a preference based on a time of day and a day-of-the-week.

20. The computer system of claim 15, further comprising:

program instructions to receive a message from the called party regarding a status of the idle condition, based on the indicator signal of the interrupt point transmitted during the delivery of the audio content.

\* \* \* \* \*